United States Patent
Seo et al.

(10) Patent No.: US 11,503,366 B2
(45) Date of Patent: *Nov. 15, 2022

(54) DYNAMIC PLAYOUT OF TRANSITION FRAMES WHILE TRANSITIONING BETWEEN PLAY OUT OF MEDIA STREAMS

(71) Applicant: Roku, Inc., San Jose, CA (US)

(72) Inventors: Chung Won Seo, Seoul (KR); Seunghyeong Lee, Joyang (KR)

(73) Assignee: ROKU, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/450,790

(22) Filed: Oct. 13, 2021

(65) Prior Publication Data
US 2022/0038770 A1    Feb. 3, 2022

Related U.S. Application Data

(63) Continuation of application No. 16/183,185, filed on Nov. 7, 2018, now Pat. No. 11,178,451.

(Continued)

(51) Int. Cl.
*H04N 21/44* (2011.01)
*H04N 21/81* (2011.01)
*H04N 21/2187* (2011.01)

(52) U.S. Cl.
CPC ..... *H04N 21/44016* (2013.01); *H04N 21/812* (2013.01); *H04N 21/2187* (2013.01)

(58) Field of Classification Search
CPC ........... H04N 21/44016; H04N 21/812; H04N 21/2187; H04N 21/8352; H04N 21/26216;

(Continued)

(56) References Cited

U.S. PATENT DOCUMENTS 8,789,097 B2    7/2014  Chen
9,860,573 B2    1/2018  Kwon et al.
(Continued)

FOREIGN PATENT DOCUMENTS

CN    105847888    8/2016
CN    106170103    11/2016
(Continued)

OTHER PUBLICATIONS

International Preliminary Report on Patentability from International Application No. PCT/US2019/035996, dated Feb. 23, 2021.

(Continued)

*Primary Examiner* — Nathan J Flynn
*Assistant Examiner* — Christine A Kurien
(74) *Attorney, Agent, or Firm* — Sterne, Kessler, Goldstein & Fox P.L.L.C.

(57) ABSTRACT

When a device is playing out a first media stream, the device determines a target time for beginning playout of a second media stream in place of the first media stream. The device then starts a stream-transition process that is expected to take anywhere from a minimum expected transition duration to a maximum expected transition duration, and the device starts the transition process in advance of the determined target time by the maximum expected transition duration, to help ensure timely starting of playout of the second media stream. Further, for an uncertainty period that extends from the minimum expected transition duration after the starting to the maximum expected transition duration after the starting, the device generates and plays a sequence of transition frames to help mask transition from the first media stream to the second media stream.

20 Claims, 5 Drawing Sheets

Related U.S. Application Data

(60) Provisional application No. 62/765,161, filed on Aug. 17, 2018.

(58) Field of Classification Search
CPC ........... H04N 21/2668; H04N 21/8358; H04N 21/23424; H04N 21/23605; H04N 21/2624

See application file for complete search history.

(56) References Cited

U.S. PATENT DOCUMENTS

| | | |
|---|---|---|
| 11,178,451 B2 | 11/2021 | Seo et al. |
| 11,317,143 B2 | 4/2022 | Seo et al. |
| 2003/0001977 A1 | 1/2003 | Wang |
| 2003/0018966 A1 | 1/2003 | Cook et al. |
| 2004/0237102 A1 | 11/2004 | Konig et al. |
| 2007/0033633 A1 | 2/2007 | Andrews et al. |
| 2009/0167942 A1 | 7/2009 | Hoogenstraaten et al. |
| 2010/0205049 A1 | 8/2010 | Long et al. |
| 2010/0218208 A1 | 8/2010 | Holdon |
| 2010/0269128 A1 | 10/2010 | Gordon |
| 2011/0022471 A1 | 1/2011 | Brueck et al. |
| 2011/0072448 A1 | 3/2011 | Stiers et al. |
| 2013/0042265 A1 | 2/2013 | Copley et al. |
| 2014/0035938 A1 | 2/2014 | Wang et al. |
| 2014/0115625 A1 | 4/2014 | McCoy et al. |
| 2014/0186014 A1 | 7/2014 | Wordley |
| 2014/0259048 A1 | 9/2014 | Brueck et al. |
| 2015/0312650 A1 | 10/2015 | Ramaswamy |
| 2016/0226942 A1 | 8/2016 | Bhardwaj et al. |
| 2016/0316261 A1 | 10/2016 | Koshevoy |
| 2017/0026670 A1 | 1/2017 | Kummer et al. |
| 2017/0099511 A1 | 4/2017 | Grover |
| 2017/0213577 A1 | 7/2017 | Wagner et al. |
| 2017/0251039 A1 | 8/2017 | Hoffert et al. |
| 2017/0311009 A1 | 10/2017 | Li |
| 2018/0061459 A1 | 3/2018 | Song et al. |
| 2018/0131981 A1 | 5/2018 | Jeong et al. |
| 2019/0069019 A1 | 2/2019 | Hsu |
| 2019/0230388 A1 | 7/2019 | Di et al. |
| 2020/0059691 A1 | 2/2020 | Seo et al. |
| 2020/0059692 A1 | 2/2020 | Seo et al. |

FOREIGN PATENT DOCUMENTS

| | | |
|---|---|---|
| CN | 107277554 | 10/2017 |
| CN | 107707969 | 2/2018 |
| JP | 2016026427 A | 2/2016 |
| JP | 2017041289 | 2/2017 |
| KR | 20180090062 | 8/2018 |
| WO | WO 2012/097006 A1 | 7/2012 |
| WO | WO2017/157191 | 9/2017 |

OTHER PUBLICATIONS

Hung T. Le, et al., "Adaptive Video Streaming with Smooth Advertisement Insertion," 2014 IEEE Fifth International Conference of Communications and Electronics (ICCE), IEEE, Jul. 30, 2014.

International Search Report and Written Opinion of the International Searching Authority directed to related International Patent Application No. PCT/US2019/035996, dated Sep. 27, 2019; 9 pages.

DYNAMIC PLAYOUT OF TRANSITION FRAMES WHILE TRANSITIONING BETWEEN PLAY OUT OF MEDIA STREAMS

REFERENCE TO RELATED APPLICATIONS

This is a continuation of U.S. patent application Ser. No. 16/183,185, filed Nov. 7, 2018, which claims priority to U.S. Provisional Patent Application No. 62/765,161, filed Aug. 17, 2018, the entirety of each of which is hereby incorporated by reference.

This application is also related to U.S. patent application Ser. No. 16/183,266, filed Nov. 7, 2018, the entirety of which is hereby incorporated by reference.

BACKGROUND

A typical media client operates to receive and play out (e.g., output for playout) an analog or digital media stream representing media content such as video and/or audio content and to output the media content and/or forward the stream for presentation of the content on a user interface such as a display screen and/or an audio speaker. Examples of such clients include televisions, computer monitors, projection systems, loudspeakers, headphones, set top boxes (e.g. cable or satellite TV receivers), digital video recorders, radios, personal computers, gaming consoles, streaming media players, and the like.

By way of example, the media client could be a television, which could receive a media stream (e.g., an over the air broadcast stream, a media stream output from a set top box, a media stream played from a digital storage medium, an Internet stream, or another such stream) and could present the media content of that stream to a user. As another example, the media client could be a set top box or digital video or audio recorder, which could receive a broadcast stream from a multi-channel video program distributor and/or from data storage and could output the media content of that stream via a High-Definition Multimedia Interface (HDMI) cable or other interface to a television and/or audio/video receiver for playout. And as yet another example the media client could be a loudspeaker or headphones, which could receive an audio stream from a radio, computer, or other receiver or audio storage device and could present the audio content of that stream to a user. Numerous other examples are possible as well.

SUMMARY

As a media client is playing out a media stream, it may be useful in certain situations for the media client to replace a portion of the stream's media content. For example, it may be useful for the client to dynamically replace an ad or other segment of the media content with a replacement ad or with other replacement content, so that as the content is being presented to a user, the user would receive the replacement ad in place of the originally included ad.

Further, it may be desirable for the client to perform such content replacement at a specific time point within the media stream. For instance, if the client is to dynamically replace an existing ad with a replacement ad, it may be desirable for the client to position the replacement ad at a time in the media stream when the existing ad would have started.

More particularly, the media stream at issue could define a sequence of frames, such as video frames and/or audio frames, and it may be desirable for the client to perform the content replacement starting at a particular frame of the media stream. For instance, for ad replacement, it may be desirable for the client to insert the replacement ad in place of the existing ad starting at the first frame of the existing ad.

To facilitate such content replacement, the client could learn the specific time point in the media stream where the client should start the content replacement, and the client could learn what replacement content that the client should start playing at the indicated time point. At the desired content-switching time point, the client could then transition from playing out the existing media stream to playing out the replacement content as a replacement media stream. Further, when the client finishes playing out the replacement media stream, the client could then transition back to playout of the original media stream (e.g., in progress).

One technical difficulty with this process is that it may take some time for the client to transition from playing out a first stream to playing out a second stream, e.g., to start a content replacement, or to switch back to the original stream at the end of a content replacement. This could be the case as the client may need to engage in several processing- and memory-intensive steps before it can start to play out the second stream. For instance, the client may need to clear caches, receive and decode at least an initial portion of content of the second stream, and populate a memory buffer with the decoded content for rendering.

In practice, this stream-transition process could take well more than one frame's worth of time. For instance, if the media at issue is video at a frame rate of 30 frames per second, each frame would span $\frac{1}{30}$ of a second, i.e., about 33.3 milliseconds (ms). Yet the act of transitioning from one video stream to another may take on the order of hundreds of milliseconds, thus spanning numerous video frames' worth of time.

Although the client could work to account for this timing by starting its stream-transition process sufficiently far in advance of the desired content-switching time point, the actual amount of time that the transition process will take may be unpredictable for various reasons. Therefore, it may be unclear precisely how early the client should start the transition process.

Unfortunately, if the client starts the transition process too early, the client might finish the process before the desired content-switching time point, which could give rise to user-experience issues, as playout of the second stream may start too early. And if the client starts the transition process too late, the client might not finish the process by the desired content-switching time point, which could likewise give rise to user-experience issues, as playout of the second stream may start too late.

To help address this issue, per the present disclosure, the client could configure its stream-transition process to start early enough so as to facilitate starting playout of the second stream at the desired content-switching time point, and the client will strategically introduce transition frames for the duration of an uncertainty period, along with fading as appropriate or desired, in order to help mask the transition and thus provide an improved user experience.

To facilitate starting playout of the second stream at the desired content-switching time point, the client could determine (e.g., from past experience or testing, or from a pre-provisioned setting) what the maximum expected transition duration could be, and the client could then start its stream-transition process at a time point $T_{START}$ that is that determined maximum expected transition duration before the desired content-switching time point. Starting at that time point, the client should then optimally finish the stream-transition process by a time point time $T_{MAX}$ that is the desired content-switching time point.

Further, the client could also determine what the minimum expected transition duration could be (similarly from past experience or testing or a pre-provisioned setting), and the client could thereby identify a time point $T_{MIN}$ that is that minimum expected transition duration from when the client starts the stream-transition process. Given this, the range of time extending from $T_{MIN}$ to $T_{MAX}$ could be considered an uncertainty period, as the client might finish its stream-transition process anytime in that range.

To help mask the transition between streams, the client could play out transition frames for the duration of the uncertainty period, i.e., from $T_{MIN}$ to $T_{MAX}$. These transition frames could take various forms depending on the type of media at issue. For instance, if the media comprises video, the transition frames could comprise black frames. Whereas, if the media comprises audio, the transition frames could comprise silent frames. Further, the client could add fading from the first stream into the transition frames and then from the transition frames to the second stream.

This process could thereby help to facilitate time-accurate switching from one stream to another while minimizing or avoiding the associated user-experience issues described above.

These as well as other aspects, advantages, and alternatives will become apparent to those of ordinary skill in the art by reading the following detailed description, with reference where appropriate to the accompanying drawings. Further, it should be understood that the descriptions provided in this summary and below are intended to illustrate the invention by way of example only and not by way of limitation.

DETAILED DESCRIPTION

Figure 1:
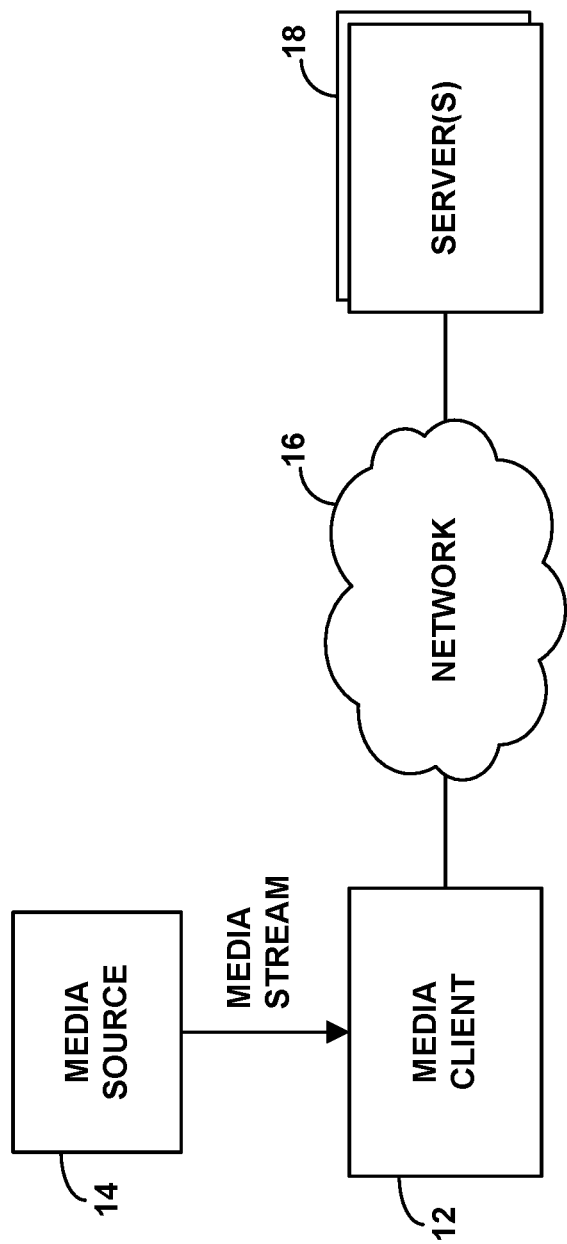
FIG. 1 is a simplified block diagram of system in which disclosed features can be implemented.

Referring to the drawings, FIG. 1 is a simplified block diagram of an example system in which various disclosed principles can be applied. It will be understood, however, that this and other arrangements and processes described herein can take various other forms. For instance, elements and operations can be re-ordered, distributed, replicated, combined, omitted, added, or otherwise modified. Further, it will be understood that operations described herein as being carried out by one or more entities could be implemented by and/or on behalf of those entities, through hardware, firmware, and/or software, such as by one or more processing units executing program instructions or the like.

As shown in FIG. 1, the example system includes a media client 12 configured to receive a media stream in real-time from a media source 14.

The media client 12 could be configured to operate as described above to receive from the media source 14 an analog or digital media stream representing media content such as video and/or audio content and to output the media content and/or forward the stream for presentation of the content on a user interface such as a display screen and/or an audio speaker. The media client could take any of the forms described above, among other possibilities.

The media source 14 could also take various forms, possibly depending on the form of the media client 12. By way of example, if the media client 12 is a television, the media source 14 could be a local set top box (e.g., cable or satellite receiver) or a streaming media server, configured to output a selected media stream for presentation by the television, or the media source 14 could be a broadcast television station or the like, among other possibilities. And if the media client is a computer, the media source may comprise an Internet streaming media server or other media provider. Alternatively, the media source 14 could be data storage integrated with and/or accessible locally by the media client 12, with the media client receiving (e.g., retrieving) the media stream from the data storage for playout, such as when the client is playing out the media stream or is forwarding the media stream for playout. Other examples are possible as well.

As further shown in FIG. 1, media client 12 could have a communication interface with a network (e.g., the Internet or a private network) 16 through which the media client can engage in communication with one or more servers 18. Servers 18 could include file servers, media servers, and/or other types of content servers or the like. Further, although media source 14 is shown separately from servers 18, media source 14 could alternatively be included or integrated with one or more of servers 18 and could be accessible via network 16.

As noted above, when a media client such as client 12 is receiving and playing out (e.g., outputting for playout) a media stream, it may be useful for the client to replace a portion of the stream with replacement content defining a replacement stream. Further, as noted above, it may be desirable for the client to do this at a specific time point within the media stream. For instance, if the stream defines a sequence of frames, such as video frames and/or audio frames, it may be desirable for the client to perform the content replacement starting at a specific frame of the sequence.

In practice, the client could learn (determine) in various ways the specific target time point in the media stream where the client should start the content replacement.

For instance, the client could be provisioned with, or receive along or in association with the media stream, a set of data that identifies or timestamps each frame within the media stream (e.g., timestamps embedded in the media stream or otherwise provided through in-stream signaling) as well as data that specifies the identity or timestamp of the frame where the content replacement is to start. Based on that data, the client could thus determine the specific time point in the media stream where the content replacement is to start.

Alternatively, as the client receives and plays out the media stream, the client could work with a network server to learn the point in the media stream where the content replacement is to start, as a desired content-switching time point. For instance, the server could first identify the media stream being played out by the client. And upon identifying the media stream, the server could then determine a specific time point in the media stream where the client should start the content replacement and could inform the client of that determined time point.

To facilitate the server's identification of the media stream being played out by the client, the client (or perhaps an adjunct device) could generate digital fingerprint data representing the media content in real time as the client receives the stream, and the server could compare that fingerprint data with reference fingerprint data representing media content of a known media stream, with a fingerprint match indicating that the media stream being played by the client is the known media stream.

The server could establish or otherwise have access to reference fingerprint data representing the known media stream. For instance, the server or an associated watching station or other entity could receive a broadcast of the known media stream and, while receiving the broadcast, could generate a sequence of reference digital fingerprints representing frames of the known media stream. The server or another entity could establish these reference fingerprints by programmatically analyzing frames of the known media stream, receiving as input a copy of the known media stream and applying any media fingerprinting process or algorithm now known or later developed to generate the reference fingerprints. Or the server could otherwise establish or be provisioned with this sequence of reference fingerprints representing the known media stream. The server could then store the reference fingerprints in association with an identity of the known media stream.

Further, in real time as the client plays out the media stream, the client could generate query fingerprints representing frames of that stream and could transmit the query fingerprints to the server for analysis. To facilitate fingerprint comparisons, the client could generate these query fingerprints using the same fingerprinting process or algorithm that is or was applied to establish the reference fingerprints. In addition, the client could generate the query fingerprints at a particular frame rate and could transmit the fingerprints in groups to the server. For instance, for a media stream comprising video at 30 frames per second, the client might generate the query fingerprints at a reduced frame rate on the order of 2 frames per second to help conserve resources, and the client might transmit a latest group of query fingerprints to the server every 1.5 seconds or so. Other examples are possible as well.

As the server receives the query fingerprint data from the client, the server could compare the query fingerprint data with the reference fingerprint data of the known media stream. And if the server thereby determines with sufficient confidence that the query fingerprint data matches the reference fingerprint data, the server could conclude that the media stream being played out by the client is the known media stream.

The server could conduct this fingerprint comparison on a per-frame basis. Considering video content, for instance, the server could conduct the analysis on a per-video-frame basis, comparing a query fingerprint of a frame against a reference fingerprint of a frame. The comparison process could take any of a variety of forms, depending on the structure of the fingerprints. For example, the comparison could involve computing a maximum deviation between the fingerprints and determining if the maximum deviation is within a predefined tolerance. Further, if the fingerprints are binary, this could be a Boolean determination or could involve computing a Hamming distance (as a count of mismatches between respective bit locations in the fingerprints). And if the fingerprints are more complex values, such as decimal values or vectors (e.g., grey values per video frame region), this could involve determining a distance between the values or vectors. Numerous other examples are possible as well.

In addition, the server could conduct this fingerprint comparison process with a desired level of tolerance. For instance, the comparison could be coarse, with relatively high tolerance for differences between the fingerprints, such as with tolerance for a greater number of differences and/or tolerance for a greater size of differences. By way of example, when comparing two 32-bit fingerprints with each other, a coarse comparison may deem the fingerprints to match each other generally even if two or another designated number of bits do not match. Or the comparison could be more granular, with lower tolerance for such differences, and/or with comparisons focused on specific fingerprint components possibly representing specific portions of the underlying media.

Through this comparison of the client-generated query fingerprints with the reference fingerprints of the known media stream, the server could thereby find one or more matches. For instance, the server could find one or more instances where a query fingerprint of a frame of the media stream being played out by the client matches a respective reference fingerprint of a frame of the known media stream. This matching could thus establish or support a conclusion that the media stream being played out by the client is the known media stream.

Alternatively, the server could identify the media stream at issue in other ways. For instance, if the media stream contains watermark data corresponding with an identity of the media stream, the client could read or otherwise extract the watermark data and report the watermark data to the server. And the server could then use the reported watermark data as a basis to identify the media stream being received by the client. For example, the server could consult reference data that correlates various watermark data with particular known media streams, to determine that the watermark data reported by the client corresponds with a particular known media stream.

Having identified the media stream being played out by the client, the server could then determine a time point in the media stream where a content replacement is to occur. For instance, the server could consult reference data that specifies a time point within the known media stream where a content replacement is to start. And the server could then transmit to the client a directive that indicates that time point.

The replacement time point specified by the server's reference data could be defined in a manner that is understandable to the client. For instance, if the client is provisioned with data that timestamps each frame of the media stream along a "true time" timeline defined within the media stream, the replacement time point that the server has might be the true-time timestamp of an upcoming frame of the media stream. The server could thus provide the client with that true-time timestamp as an indication of the time when the client should start the content replacement.

Further, the client could map that true-time timestamp to "client time" defined according to the client's internal clock so that the client can determine a time on its own clock when it should start the content replacement. For instance, the client could (i) compute a difference between the true-time timestamp of a current frame and the current time on the client's clock and (ii) apply that determined difference to the indicated true-time timestamp of the upcoming frame where the replacement is to occur, to determine the client-time point when the client should start the content replacement.

Alternatively, the replacement time point specified by the server's reference data might be defined in a manner that is not understandable to the client. For instance, the replacement time point that the server has might be a timestamp defined according to a true-time timeline within the known media stream, but the client might have no context or perspective for true time. In that case, the server could engage in a process to establishing a mapping or "synchronous lock" between true time and client time, and the server then map the true-time time point where the content replacement is to occur to a corresponding client-time time point and provide that client-time time point to the client.

As an non-limiting example of this, consider a media stream that defines an ad pod that could appear within a television broadcast. An ad pod comprises a sequence of ads, such as television commercials. With this example, the client might be a television that is receiving and playing out a linear broadcast feed of a particular television channel, and the ad pod might appear at any moment within that feed. Especially with a live broadcast such as a sporting event, for instance, the time when the ad pod appears in such a feed may be unpredictable. Alternatively, the ad pod could appear at a specifically scheduled time.

In this example, the desired content replacement could be replacement of a particular ad within the ad pod (e.g. substituting for the ad a different ad or other replacement content). For instance, if the ad pod is a sequence of ads A1, A2, A3, A4, the desired content replacement could be replacement of ad A3.

In this situation, the ad pod may define a true-time timeline starting at time T=0 and continuing to the end of the ad pod, and ad A3 may begin at time $T_{A3}$ on that timeline. However, the client may lack context for that timeline. The client may have its own internal clock that has a timeline (e.g., time of day or other internal time reference) defining client time. But without advanced knowledge of where the ad-pod timeline exists within client time, merely given the value $T_{A3}$ as the desired content-revision time point would not enable the client to start the ad replacement when desired.

For the server to establish synchronous lock between true time and client time in that context, the client could time-stamp the query fingerprints that the client sends to the server. In particular, as the client plays out the media stream and generates query fingerprints, the client could timestamp each query fingerprint with a current client-time value. When the server detects one or more matches between the query fingerprints and timestamped reference fingerprints of the known media stream, the server could then use those matching points as a basis to map true time to client time. For instance, based on at least one such detected matching point, the server could define a mapping between (i) the true-time timestamp of the matching reference fingerprint and (ii) the client-time time stamp of the matching query fingerprint.

Once the server has established synchronous lock, the server could then use the established synchronous lock to translate the true-time time point where the content replacement is to occur into a corresponding client-time time point at which the content replacement is to occur. And the server could transmit that determined client-time time point to the client, to enable the client to start the content replacement at the desired time point in the media stream that the client is playing out.

Further, in an alternative implementation, the client rather than the server could carry out the process of establishing and applying synchronous lock in order to determine the client time point where the content replacement is to occur.

For instance, once the server has identified the media stream being received by the client, the server could transmit to the client some reference data defining reference fingerprints and true-time timestamps for an upcoming portion of the known media stream. The client could then conduct the fingerprint matching between query fingerprints and reference fingerprints to find one or more matching points, and the client could establish synchronous lock between true time and client time by similarly correlating the timestamps of at least one matching point. Once the client has established the synchronous lock, the client could then use the synchronous lock as a basis to translate a provided true-time time point where the content replacement is to occur into a corresponding client-time time point where the content replacement is to occur.

In addition to determining the specific target time point in the media stream when the client should start the content replacement, the client could also learn in various ways what content replacement the client should perform starting at that time point.

By way of example, the client could be pre-provisioned in advance with a specification of the content replacement to start at the indicated time point, such as an indication that the client should substitute certain content in place of existing content of the media stream. Alternatively, the client could receive from a server or another entity a specification of the content replacement to perform. For instance, when a server transmits to the client a directive informing the client of the time point in the media stream when the client is to start the content revision, the server could include in that directive (or provide separately) to the client a specification of the content replacement to perform.

In practice, the specification of the content replacement to perform could comprise a pointer to replacement content that the client is to obtain and is to insert in place of or as a supplement to existing content of the media stream. For example, as noted above, the specification could comprise a Universal Resource Locator (URL) that defines or correlates with a network address of a streaming media server, file server, or the like, from which the client could request and receive the replacement content. Alternatively, the specification could indicate in another way where and/or how the client is to obtain the replacement content, to facilitate performing the content replacement starting at the indicated time point in the media stream. Further, the specification could indicate a duration of the replacement content, to inform the client how long the client should play the replacement content in place of the original content.

At the indicated time point where the content replacement is to start, the client could thus switch from playing out the existing media stream to playing out the replacement content as a replacement media stream. Further, at the end of the content replacement, the client could then switch back to playing out the original media stream (e.g., in progress).

As a non-limiting example, consider again the ad pod discussed above. In practice, a server could be provisioned with timestamped reference fingerprints representing and corresponding with the frames of the ad pod. Further, the server could be provisioned with an indication that a particular one of the ads in the ad pod should be replaced, and with information to facilitate that ad replacement. For instance, the server could be provisioned with an indication of the true-time point of the first frame of the existing ad, a URL of a replacement ad, and an indication of the duration of the replacement.

On an ongoing basis as the client receives and plays out a linear broadcast feed that may contain this ad pod, or in response to one or more other triggers, the client could be generating timestamped query fingerprints of the broadcast feed and could be reporting those timestamped query fingerprints to the server for analysis. Comparing such query fingerprints with the reference fingerprints representing the frames of the ad pod sequence, the server could thereby detect that the client is playing out the ad pod sequence.

Having determined that the client is playing out the ad pod sequence, the server could then translate the true-time point of the frame where the ad replacement is to start into a corresponding client-time point in the manner discussed above for instance and could transmit to the client a directive that specifies that client-time point, includes a pointer to a replacement ad that the client is to substitute for frames of the media stream starting at that client-time, and directs the client to perform the indicated content replacement. Accordingly, the client could obtain the indicated replacement ad and could substitute that ad for frames of the media stream starting at the indicated client-time point.

Further, the server could inform the client of a duration of the ad replacement or of a client-time point when the ad replacement is to end, or that duration could be a standard or pre-set duration. And at the end of the ad replacement, the client could then switch back from playing out the replacement ad to playing out the broadcast feed (e.g., a remainder of the ad-pod sequence) in progress.

As explained above, a technical problem that can arise in this process is that it may take some time for the client to transition from playing out one stream to playing out another stream, such as from playing out an ad-pod sequence in a linear broadcast stream to playing out a replacement ad stream. In particular, as noted above, the client may need to engage in various processes, such as clearing caches, receiving and decoding content, and populating memory buffers, to facilitate starting to play out the replacement stream.

The starting point of this stream-transition process could be defined in various ways. For instance, if the client will receive content of the second stream from a streaming media server, the start of the stream-transition process could be when the client sends an initial Transport Control Protocol (TCP) handshake message to initiate setup of a TCP session with the server or when the client sends a Real-Time Streaming Protocol (RTSP) SETUP request or the like to initiate setup of a real-time transport protocol (RTP) session with the server, among other possibilities. Alternatively, if the client would receive content of the second stream in another manner or from another source, the starting point of the process could be defined in other ways. The end of the process could then be defined as the point in time when the client has buffered enough of the second media stream to start playing the stream while accounting for jitter and/or other issues. Other examples are possible as well.

As noted above, the stream-transition process, from start to finish, may take on the order of hundreds of milliseconds. Further, as resource constraints and other factors change from time to time, the actual amount of time that it will take the client to transition from one stream to another in any given instance may be unpredictable.

Experience may establish minimum and maximum expected stream-transition durations for the client (or for a representative client). For instance, testing might show that it will take anywhere from 300 ms to 500 ms for the client to transition from playout of a first stream to playout of a second stream (e.g., to the point where the client is ready to start playing the second stream). Thus, the client may have a minimum expected switching duration of 300 ms and a maximum expected transition duration of 500 ms, defining a 200 ms uncertainty range, among other possibilities.

The client could determine these minimum and maximum expected stream-transition durations by tracking stream-transition durations over time and rolling up the tracked durations to establish statistical measures of minimum and maximum, and/or the client could otherwise be provisioned with representative values of the expected transition durations.

Given the expectation that the stream-transition process should take no longer than the maximum expected transition duration, the client could configure its stream-transition process to start in advance of the desired content-switching time point by an amount of time equal to the maximum expected transition duration. That way, the client should complete the stream-transition process by the time the desired content-switching time point arrives.

Unfortunately, however, once the client has finished its preparations for playing out the second stream, the client may then no longer be in a position to play out the first stream sufficiently, since the client may now be buffering the second-stream content for playout rather than buffering the first-stream content for playout. Therefore, if the client finishes its preparations for playout out the second stream before the end of the maximum expected switching duration has passed, then the client may start playout of the second stream before the desired content-switching time point, which may result in user-experience issues. Further, for content-replacement such as ad replacement, this premature starting of the playout of the of the second stream might create associated user-experience issues at the end of the replacement duration when the client is to switch back from playout of the second stream to playout of the first stream.

One way to help avoid having the client start playout of the second stream earlier than desired is for the client to instead configure its stream-transition process to start in advance of the desired content-switching time point by an amount of time that is less than the maximum expected transition duration. For instance, the client could start its stream-transition process in advance of the desired content-switching time point by an amount of time that is less than the maximum expected transition duration but greater than or equal to the minimum expected transition duration.

Yet this solution may also not be optimal, since the client may then finish its stream-transition preparations too late, namely after the desired content-switching time point has passed. And in that case, the client may end up playing some of the underlying content that is supposed to be replaced and then abruptly switching to playout of the replacement content, which may also result in a poor user experience. Alternatively, with this solution, the client might still finish its preparations for playout of the second stream too early (before the desired content-switching time point), again resulting in user experience issues as noted above.

The help address this technical problem, as noted above, the client could configure the timing of its stream-transition process to facilitate starting playout of the second stream at the desired content-switching time point, and the client will strategically introduce transition frames for the duration of the uncertainty period, along with fading as appropriate, to help mask the transition and thus provide an improved user experience.

In particular, the client could start its stream-transition process in advance of the desired content-switching time point by the maximum expected switching duration (e.g., 500 ms), which should enable the client to start playout of the second stream at the desired content-switching time point. Further, to help cope with the possibility that the client will finish its preparations for playout of the second stream before the desired content-switching time point arrives (i.e., before the maximum expected switching duration has passed), the client will strategically play out transition frames throughout the uncertainty period extending from (i) the minimum expected transition duration after the start of the stream-transition process to (i) the maximum expected transition duration after the start of the stream-transition process.

In practice, the transition frames that the client plays out through the uncertainty period could take various forms, based on the type of media at issue.

For instance, if the media comprises video, then the transition frames could comprise black frames and/or copies of a frame immediately preceding the transition. In particular, the client could present black frames for the duration of the uncertainty period, possibly fading from the first stream to the black frames so as to arrive at black frames by the start of the uncertainty period, and possibly fading from the black frames to the second stream starting at or approximately when playout of the second stream starts (e.g., at the desired content-switching time point). Alternatively, for some time into the uncertainty period, the client could present frames that are a copy of a latest frame of the first stream and could then fade from that image to black and then fade back to the second stream starting at the desired content-switching point.

Whereas if the media comprises audio, then the transition frames could comprise silent frames. In particular, the client could present silent frames for the duration of the uncertainty period, possibly fading from audio of the first stream to the silent frames so as to arrive at the silent frames by the start of the uncertainty period, and possibly fading from silent frames to the audio of the second stream starting at the desired content-switching time point. Other examples, including combinations of and variations from these examples, are possible as well.

Figure 2:
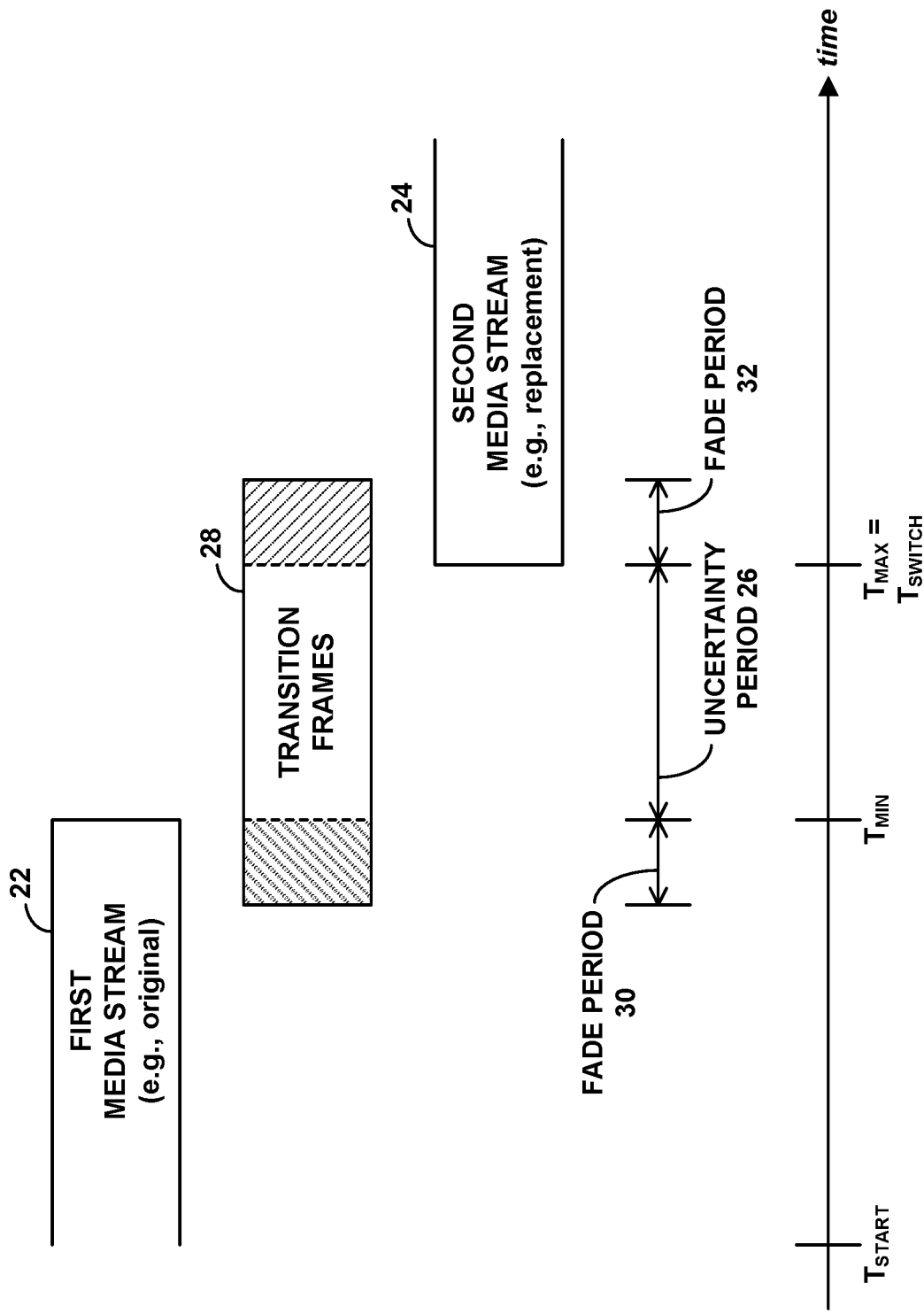
FIG. 2 is a diagram illustrating a stream-transition with addition of transition frames in accordance with the disclosure.

FIG. 2 is a diagram illustrating without limitation an example of how this process could work in practice, along a timeline with time progressing from left to right. As shown in FIG. 2, time $T_{SWITCH}$ denotes the desired content-switching time point. For instance, as a client is receiving a linear broadcast feed that includes an ad pod, time $T_{SWITCH}$ could be a client-time point at which the client is to start playing a replacement ad in place of an ad within the ad pod. More generally, the client could be initially playing a first media stream (e.g., a linear broadcast feed) 22, and at time $T_{SWITCH}$ the client is to switch from playing the first media stream 22 to instead playing a second media stream (e.g., a replacement ad stream) 24.

This example assumes that it will take the client anywhere from 300 ms to 500 ms to switch from receiving and playing the first media stream 22 to receiving and playing the second media stream 24. In line with the discussion above, the client could therefore begin this switching process 500 ms before the desired content-switching time point $T_{SWITCH}$. FIG. 2 illustrates this switching-process start time as time $T_{START}$. Further, the figure then illustrates the minimum and maximum expected switching durations $T_{MIN}$ and $T_{MAX}$, as being 300 ms and 500 ms respectively after the switching-process start time $T_{START}$, defining a 200 ms uncertainty period 26 from $T_{MIN}$ to $T_{MAX}$, and with $T_{MAX}$ being equal to $T_{SWITCH}$. With this timeline, once the client begins the stream-transition process, the expectation is that the client would likely complete its preparations for playout of the second stream 24 at some point within this uncertainty period, so that the client can start playout of the second stream at time $T_{SWITCH}$.

To help mask the transition from the first stream to the second stream, the client in this example will play out transition frames for the duration of the uncertainty period, i.e., from $T_{MIN}$ to $T_{MAX}$. FIG. 2 denotes this sequence of transition frames as sequence 28. Further, the figure shows playout of the first media stream 22 ending at $T_{MIN}$, playout of the transition frames occurring from $T_{MIN}$ to $T_{MAX}$, and playout of the second media stream 24 starting at $T_{MAX}$ (i.e., $T_{SWITCH}$).

As further shown, the client could add fading from the first media stream 22 to the transition frames and then from the transition frames to the second media stream. To facilitate this, the client could expand the sequence of transition frames 28 to start by a fade period 30 before $T_{MIN}$ and to continue for a fade period 32 after $T_{MAX}$. As shown, throughout fade-period 30, the client would thus present both the first media stream 22 and the transition frames and would be fading from the first media stream 22 to the transition frames. And throughout fade period 32, the client would similarly present both the transition frames and the second media stream 24 and would be fading from the transition frames to the second media stream.

The client may be configured with native functionality to introduce black frames, silent frames, and fading in/out. And the client may make use of that functionality to facilitate this process. For instance, to introduce black frames, the client could generate each frame as a fully black image and output the frame for playout, resulting in presentation of the black frame on a user interface such as a display. Likewise, to introduce silent frames, the client could generate each frame with zero-level audio and could output the frame for playout, resulting in presentation of silence on a user interface such as a sound speaker. And to introduce fading in and out, the client could programmatically apply a dissolve algorithm, generating frames that morph between images and/or audio.

As noted above, to the extent the media at issue is video, one alternative to playing just black frames as the transition would be for the client to play frames that are a copy of a last presented frame of the first media stream 22. For instance, at the start of the fade-period 30, the client could capture a still image of the current frame of the first media stream 22. The client could then present that still image in repeated frames during the fade period 28, thus fading from that still image to black. Still alternatively, the client could present other types of images or colors as the transition frames, not limited to black frames or an image of a last frame of the first media stream.

With this example process, the client would thus likely complete its switching preparations sometime during the uncertainty period 26. The client could then wait until the desired content-switching time point $T_{SWITCH}$ before the client starts playout of the second media stream 24. And the client would be playing transition frames for the time being to help mask the transition.

Note that, in a content-replacement scenario such as replacing an ad within an ad pod, the client can then apply a similar process at the end of the replacement period, to help mask the transition back to the first media stream. Here, the switching time $T_{SWITCH}$ would be the client-time point when the client is to revert to playing out the first media stream, which could be defined by an indicated duration of the replacement content (e.g., a replacement ad) or in another manner. The client could thus start the process of switching from the second media stream back to the first media stream at a time that is the maximum expected switching duration $T_{MAX}$ before that switching time $T_{SWITCH}$. And the client could then similarly play out transition frames for the duration of the uncertainty period, possibly expanded and with fading as discussed above, thereby helping to mask the transition.

Note also that the uncertainty period and/or fade periods could be expanded to account for uncertainty in the initial prediction of the desired content-switching time point. For instance, if the client-time point to start playing replacement content is predicted based on low-rate query fingerprints, or faced with other issues, the predicted client-time might not be entirely accurate. Given this, the client could bias the uncertainty period to be longer than it might otherwise be, and so the client could play transition frames for a longer duration. For instance, the client could bias the maximum expected transition duration to be longer and could shift the start point $T_{START}$, to produce a longer uncertainty period extending earlier and later than it would have otherwise. Further or alternatively, the client could expand the fade periods 30, 32 to similarly account for the added uncertainty. In addition, the client could adjust or set the maximum expected transition duration and/or minimum expected transition duration, or associated timing values, to achieve a desired result.

Figure 3:
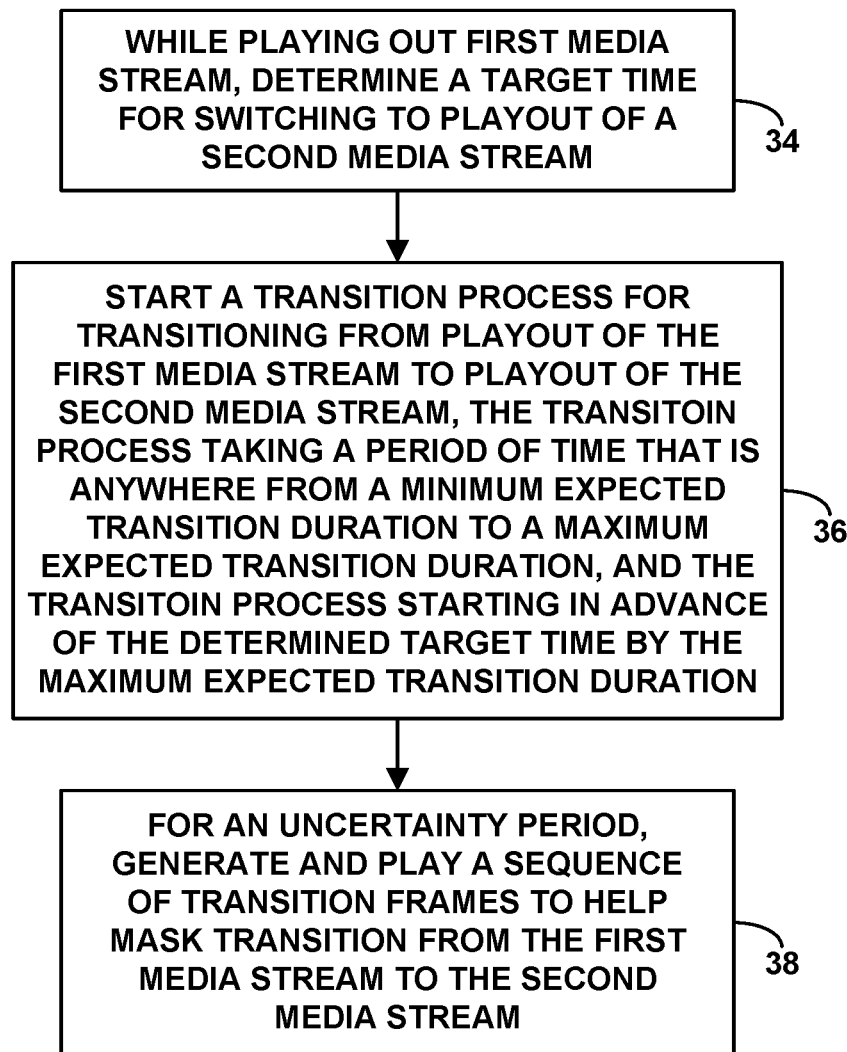
FIG. 3 is a flow chart depicting a method that could be carried out in accordance with the disclosure.

FIG. 3 is next a flow chart depicting a method that can be carried out in accordance with this disclosure. This method could be carried out by a device such as a media client or other playback device, to facilitate transition from playing out a first media stream to playing out a second media stream.

As shown in FIG. 3, at block 34, while the device is playing out the first media stream, the device determines a target time for beginning to play out the second media stream, for content replacement or for another purpose. For instance, in a content-replacement scenario, this could be a client-time point at which the client is to start playout of replacement content of the second media stream to substitute for content of the first media stream. The device could determine this target time by receiving a directive from a server or other entity specifying the target time and/or by itself evaluating to determine the target time, among other possibilities, and the process could include establishing synchronous lock as discussed above.

At block 36, the device then starts a stream-transition process for transitioning from playout of the first media stream to playout of the second media stream. As discussed above, this stream-transition process could take a period of time that is anywhere from a minimum expected transition duration to a maximum expected transition duration. Further, the device could strategically start the transition process in advance of the determined target time by the maximum expected transition duration, to help ensure that the device will be ready to start playing the second media stream by the target time.

At block 38, for an uncertainty period, the device then generates and plays a sequence of transition frames to help mask transition from the first media stream to the second media stream. As discussed above this uncertainty period will extend from (i) the minimum expected switching duration after the start of the transition process to (ii) the maximum expected switching duration after the start of the transition process. That way, even if the device completes its preparations for playout of the second stream before the end of the uncertainty period, the device could still wait until the target time before starting to play the second media stream, and the transition frames will help cover up the intervening time.

As further discussed above, the method could additionally involve the device implementing fading (e.g., dissolving or morphing) from the first media stream to the transition frames for a first fade period leading up to the uncertainty period. And likewise, the method could involve the device implementing fading from the transition frames to the second media stream for a second fade period that starts upon completion of the uncertainty period.

Further, as discussed above, if the first and second media streams comprise video, the transition frames could comprise black frames and/or frames that are a copy of a last played frame of the first media stream. And if the first and second media streams comprise audio, the transition frames could comprise silent frames. Other examples could be possible as well.

Figure 4:
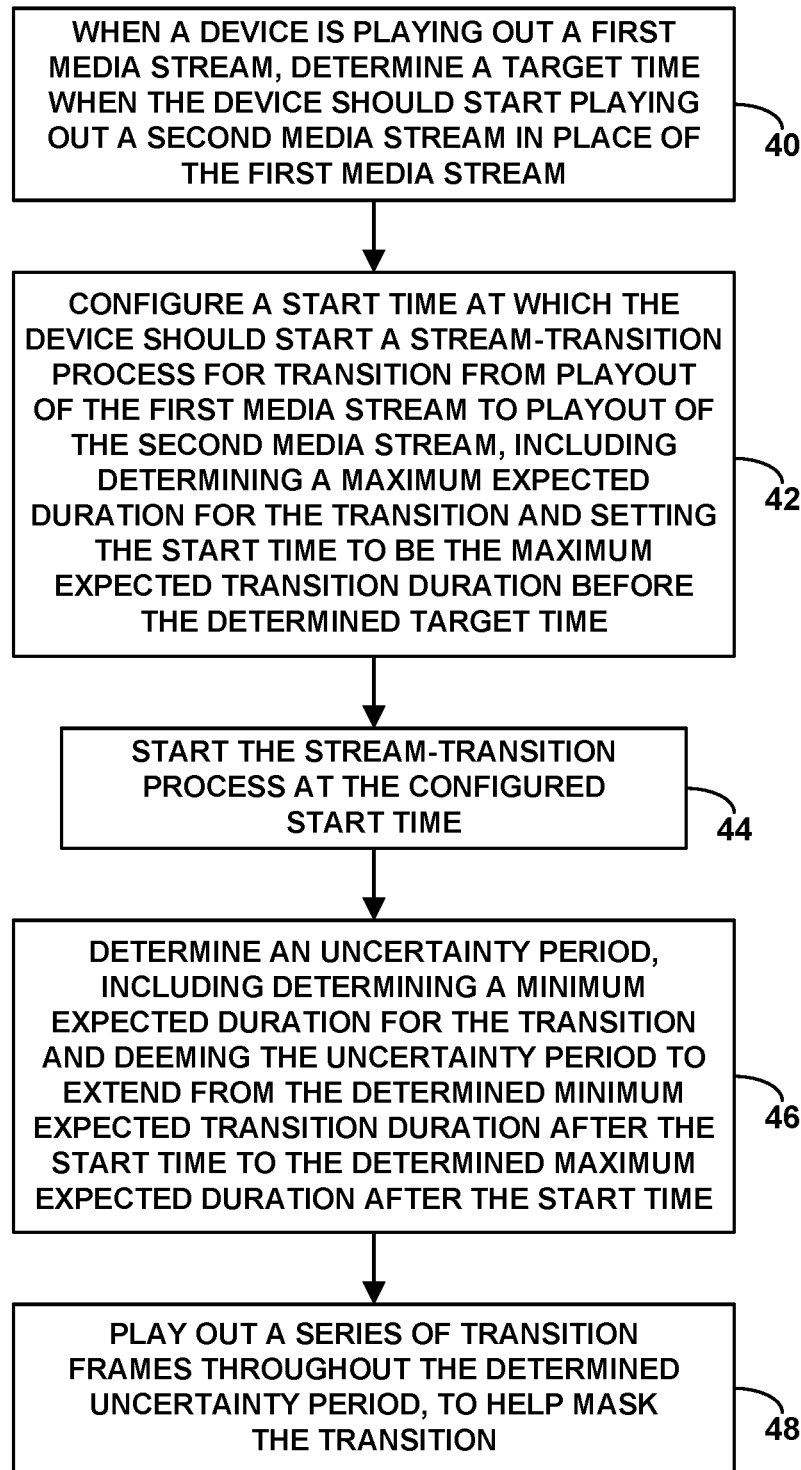
FIG. 4 is another flow chart depicting a method that could be carried out in accordance with the disclosure.

FIG. 4 is another flow chart depicting a method that can be carried out in accordance with this disclosure. This method could similarly be carried out by a device such as a media client or other playback device, to facilitate transition from playing out a first media stream to playing out a second media stream. Further, while operations are shown in an order in this figure, note that the order of operations can vary from that shown.

As shown in FIG. 4, at block 40, when a device is playing out a first media stream, the device determines a target time when the device should start playing out a second media stream in place of the first media stream. At block 42, the device then configures a start time at which the device should start a stream-transition process for transition from playout of the first media stream to playout of the second media stream. In particular, the device determines a maximum expected duration for the transition and sets the start time to be the maximum expected transition duration before the determined target time. At block 44, the device then starts the stream-transition process at the configured start time.

Further, at block 46, the device determines an uncertainty period. In particular, the device determines a minimum expected duration for the transition and deems the uncertainty period to extend from (i) the determined minimum expected transition duration after the start time to (ii) the determined maximum expected duration after the start time. And at block 48, the device plays out a series of transition frames throughout the determined uncertainty period, to help mask the transition.

In this method, the determining of the maximum and minim expected durations for the transition could be based on monitoring by the device of past stream transitions and/or could involve reading configuration data or the like that specifies predefined values of these durations, among other possibilities.

In addition, as discussed above, the method could involve the device adding fading from the first media stream to the transition frames and/or fading from the transition frames to the second media stream. And the transition frames could include black frames, silent frames, and/or frames that are a copy of a last played frame of the first media stream. Further, the transition could be from a linear broadcast feed to a replacement ad or vice versa. And as noted above, the method could additionally involve extending the uncertainty period.

Figure 5:
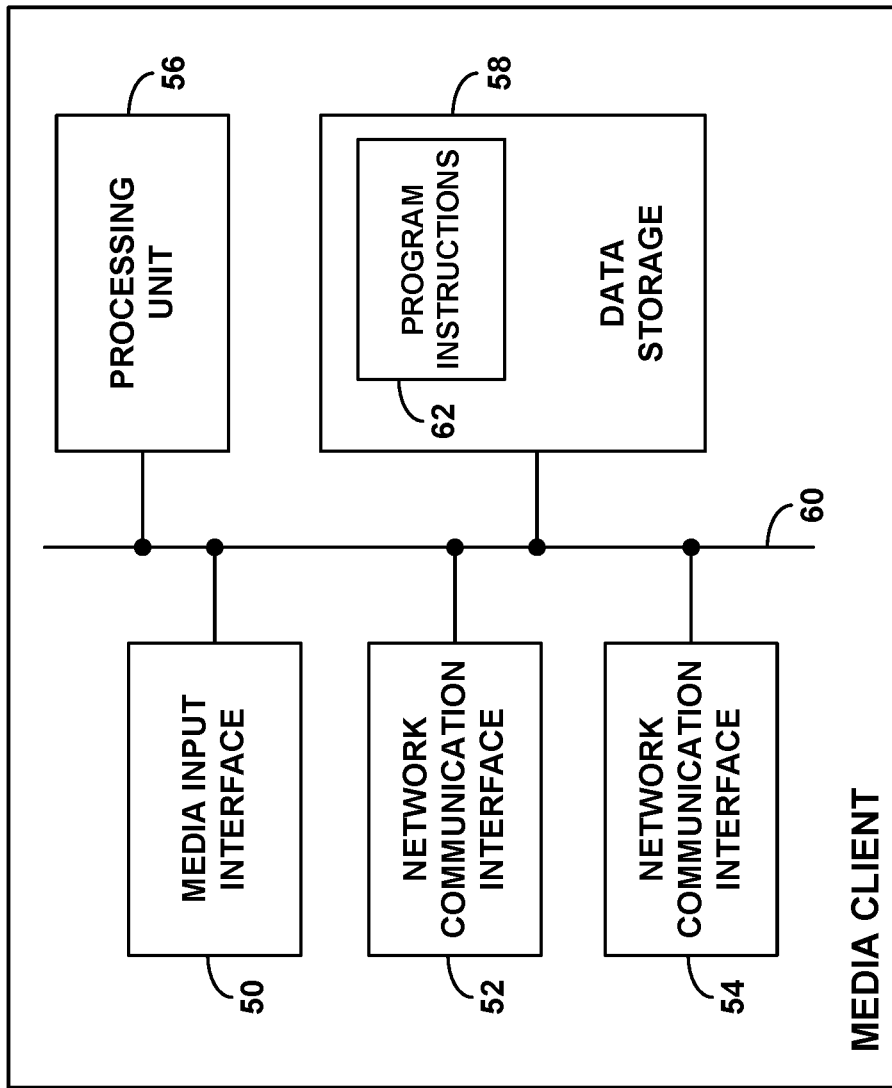
FIG. 5 is a simplified block diagram depicting components of an example media client that could operate in accordance with the disclosure.

Finally, FIG. 5 is a simplified block diagram of an example media client, showing some of the components that can be included in such a device to facilitate carrying out operations such as those noted above. In line with the discussion above, this client could take various forms. For instance, it could be a television, computer monitor, or other device that operates to receive video content and output the video content for presentation, and/or it could be a loudspeaker, a pair of headphones, or other device that operates to receive audio content and output the audio content for presentation. Numerous other examples are possible as well.

As shown in FIG. 5, the example client includes a media input interface 50, a network communication interface 52, a media presentation interface 54 a processing unit 56, and non-transitory data storage 58, any or all of which could be integrated together or, as shown, communicatively linked together by a system bus, network, or other connection mechanism 60.

The client could use media input interface 50 and/or network communication interface 52 to receive media streams for presentation. Either of these interfaces could include one or more wired and/or wireless interfaces for establishing communication with and receiving media content in analog or digital form from a receiver, server, or other device or system. For example, the media input interface could include one or more interfaces compliant with protocols such as DVI, HDMI, VGA, USB, BLUETOOTH, WIFI, among numerous others, and the network communication interface could comprise a wired or wireless Ethernet interface, for engaging in local or wide area packet-based communication so as to interact with one or more servers and/or other devices or systems.

Media presentation interface 54 could then comprise one or more components to facilitate presentation of media content. By way of example, the media presentation interface could comprise a user interface such as a display screen and/or a loudspeaker, as well as one or more drivers or other components for processing the received media content to facilitate presentation of the content on the user interface.

Processing unit 56 could comprise one or more general purpose processors (e.g., microprocessors) and/or one or more specialized processors (e.g., application specific integrated circuits). And non-transitory data storage 58 could comprise one or more volatile and/or non-volatile storage components, such as optical, magnetic, or flash storage. Further, as shown, data storage 58 could store program instructions 62, which could be executable by processing unit 56 to carry out various operations described herein (e.g., to cause the client to carry out the disclosed operations).

Exemplary embodiments have been described above. Those skilled in the art will understand, however, that changes and modifications may be made to these embodiments without departing from the true scope and spirit of the invention.

What is claimed is:

1. A media client comprising:
   non-transitory data storage; and
   at least one processor coupled to the non-transitory data storage and configured to perform operations comprising:
   while the media client is playing out a first media stream, determining a target time when the media client should start playing out a second media stream in place of the first media stream;
   configuring a start time at which the media client should start a stream-transition process for transition from the playing out of the first media stream to the playing out of the second media stream, wherein configuring the start time includes determining a maximum expected duration for the transition and setting the start time to be the maximum expected duration before the determined target time;
   starting the stream-transition process at the configured start time;
   determining an uncertainty period, wherein determining the uncertainty period includes determining a minimum expected duration for the transition and deeming the uncertainty period to extend from (i) the determined minimum expected duration after the start time to (ii) the determined maximum expected duration after the start time, and
   playing out a series of transition frames throughout the determined uncertainty period, to help mask the transition.

2. The media client of claim 1, wherein the operations further comprise adding fading from the first media stream to the transition frames.

3. The media client of claim 1, wherein the operations further comprise adding fading from the transition frames to the second media stream.

4. The media client of claim 1, wherein the transition frames comprise frames selected from the group consisting of (i) black frames, (ii) silent frames, and (iii) frames that are a copy of a last played frame of the first media stream.

5. The media client of claim 1, wherein the first media stream comprises a linear broadcast feed, and wherein the second media stream comprises a replacement ad.

6. The media client of claim 1, wherein the first media stream comprises a replacement ad, and wherein the second media stream comprises a linear broadcast feed.

7. The media client of claim 1, wherein the operations further comprise extending the uncertainty period.

8. Non-transitory data storage storing program instructions executable by one or more processors to cause a media client to carry out operations including:
   while the media client is playing out a first media stream, determining a target time when the media client should start playing out a second media stream in place of the first media stream;
   configuring a start time at which the media client should start a stream-transition process for transition from the playing out of the first media stream to the playing out of the second media stream, wherein configuring the start time includes determining a maximum expected duration for the transition and setting the start time to be the maximum expected transition duration before the determined target time;
   starting the stream-transition process at the configured start time;
   determining an uncertainty period, wherein determining the uncertainty period includes determining a minimum expected duration for the transition and deeming the uncertainty period to extend from (i) the determined minimum expected duration after the start time to (ii) the determined maximum expected duration after the start time; and
   playing out a series of transition frames throughout the determined uncertainty period, to help mask the transition.

9. The non-transitory data storage of claim 8, wherein the operations further comprise adding fading from the first media stream to the transition frames.

10. The non-transitory data storage of claim 8, wherein the operations further comprise adding fading from the transition frames to the second media stream.

11. The non-transitory data storage of claim 8, wherein the transition frames comprise frames selected from the group consisting of (i) black frames, (ii) silent frames, and (iii) frames that are a copy of a last played frame of the first media stream.

12. The non-transitory data storage of claim 8, wherein the first media stream comprises a linear broadcast feed, and wherein the second media stream comprises a replacement ad.

13. The non-transitory data storage of claim 8, wherein the first media stream comprises a replacement ad, and wherein the second media stream comprises a linear broadcast feed.

14. The non-transitory data storage of claim 8, wherein the operations further comprise extending the uncertainty period.

15. A method for transition by a device from playout of a first media stream to playout of a second media stream, the method comprising:
determining, by at least one computer processor, a target time for beginning playout of the second media stream;
starting a transition process of transitioning from the playout of the first media stream to the playout of the second media stream, wherein the transition process takes a period of time that is between a minimum expected transition duration to a maximum expected transition duration, and wherein the starting occurs in advance of the determined target time by the maximum expected transition duration; and
for an uncertainty period, generating and playing a sequence of transition frames to help mask transition from the first media stream to the second media stream, wherein the uncertainty period extends from (i) the minimum expected transition duration after the starting to (ii) the maximum expected transition duration after the starting.

16. The method of claim 15, further comprising:
implementing fading from the first media stream to the transition frames for a first fade period leading up to the uncertainty period; and
implementing fading from the transition frames to the second media stream for a second fade period starting upon completion of the uncertainty period.

17. The method of claim 15, wherein the first and second media streams comprise video, and wherein the transition frames comprise black frames.

18. The method of claim 15, wherein the first and second media streams comprise audio, and wherein the transition frames comprise silent frames.

19. The method of claim 15, wherein determining the target time is based on fingerprint analysis and includes establishing a synchronous lock.

20. The method of claim 15, wherein the transitioning from playout of the first media stream to playout of the second media stream is for content replacement.

* * * * *

UNITED STATES PATENT AND TRADEMARK OFFICE
CERTIFICATE OF CORRECTION

PATENT NO. : 11,503,366 B2  
APPLICATION NO. : 17/450790  
DATED : November 15, 2022  
INVENTOR(S) : Chung Won Seo et al.

Page 1 of 1

It is certified that error appears in the above-identified patent and that said Letters Patent is hereby corrected as shown below:

On the Title Page

Item (72), "Joyang (KR)" should read --Goyang (KR)--.

In the Claims

Claim 1, Column 16, Line 12 "start time, and" should read --start time; and--.

Claim 8, Column 16, Line 48 "expected transition duration" should read --expected duration--.

Claim 15, Column 17, Line 16 "transition by a device from playout" should read --transition from playout--.

Signed and Sealed this  
Sixth Day of June, 2023

Katherine Kelly Vidal  
*Director of the United States Patent and Trademark Office*